May 13, 1958     E. SCHASCHL     2,834,858

CORROSION TESTING PROBE

Filed Dec. 18, 1956

INVENTOR.
EDWARD SCHASCHL
BY Edward H. Lang
ATTORNEY

United States Patent Office 2,834,858
Patented May 13, 1958

2,834,858

CORROSION TESTING PROBE

Edward Schaschl, Crystal Lake, Ill., assignor to The Pure Oil Company, Chicago, Ill., a corporation of Ohio Application December 18, 1956, Serial No. 629,077

11 Claims. (Cl. 201—63)

This invention relates to a corrosion-testing probe designed so that the test specimens may be easily replaced and various types of test specimens may be used in a number of consecutive tests. The invention lies particularly in the arrangement of seals and holding means for both the exposed and protected test elements, and the arrangement of the test probe as a unit for ready attachment within a corrosive atmosphere, in connection with an electrical-measuring device as will be described.

Many of the previous designs of corrosion-test probes have left the assembly of the test elements to a matter of fabrication wherein a common juncture must be welded between the protected and unprotected test elements and a common lead also attached thereto. Also, the base ends of the test elements and the lead must be provided with suitable support means. As far as the present inventor is aware, no corrosion-test probe is available which provides for using readily available forms of test-metal strips or wire and the prior art instruments must generally be calibrated for the particular size, shape and electrical properties of the test elements which are attached to the supporting means. As will be seen from the description of the invention, the present device provides a re-useable supporting means adapted to carry test specimens which are readily cut from metal sheets or wire composed of the materials of construction under test. Furthermore, the supporting elements of this invention are designed for use in making corrosion rate measurements under conditions of moderate temperature and pressure and the support member may be re-used for an unlimited number of such tests.

The device of this invention makes use of the expedient of direct observation of the influence of corrosion under actual service conditions. In this method, advantage is taken of the heterogeneity of the corrosive environment and is one of the most practical methods of corrosion measurement. Metallic test specimens may be simply suspended on a hanger, or by means of a multi-unit support for a number of test specimens, in insulated relationship to exclude galvanic contacts. But, such methods do not provide means for performing corrosion tests in inaccessible places or in pressurized environments and require tedious weighing and re-weighing of the test specimens to determine the extent and rate of corrosion. Furthermore, the results found from weight-loss methods are subject to errors and a large number of specimens are necessary to determine a proper time-corrosion curve.

Accordingly, this invention takes advantage of the methods that have been devised which make use of the correlation between change in electrical conductivity and change in cross-sectional area to determine the rate of corrosion of various materials of construction through the use of corrosion-test probes connected to electrical resistance-change meters. These instruments, known and widely used in the art, employ resistance bridges and function like analogue computers to indicate quantitatively the changes in physical characteristics which cannot be conveniently measured by other methods. There are several recent modifications of this principle. One such modification is described in a co-pending application entitled, "Apparatus for Determining the Influence of Corrosion on Metallic Materials of Construction," bearing Serial Number 528,032, filed August 12, 1955, by G. A. Marsh and the present inventor. Application Serial Number 528,032 describes means for compensating for temperature changes wherein one test specimen is mounted in exposed condition to the corrosive atmosphere and another test specimen is insulated or protected from the corrosive atmosphere by means of a suitable protective coating placed thereon. The coupons or test specimens are connected in a circuit so as to comprise one-half of a typical resistance bridge. Suitable electrical connections are made with the other half of the bridge, which is placed outside the corrosive environment along with the power supply to the bridge, and an appropriate electrical meter, such as a galvanometer, functions as a null detector. Loss of metal on the unprotected specimen induces small increases in resistance in the circuit which are correlated with metal loss by appropriate formulae described in the application.

In another co-pending application entitled, "Electronic Resistance-Change Meter," Serial Number 528,061, filed, August 12, 1955, by Lynn E. Ellison, there is described an electronic apparatus for conveniently detecting and measuring changes in resistance, and provides for direct reading of the rate of corrosion. The corrosion-test probe of the present invention may be used in conjunction with the apparatus described in the foregoing applications. In still another co-pending application by the present inventor entitled, "Improved Corrosion Test Probes for Use With Corrosion Testing Apparatus," filed March 1, 1956, and bearing Serial Number 568,906, there are described corrosion-test probes of increased rigidity, durability and strength. These probes comprise a non-conducting specimen holder which may be in the form of a ceramic core having test specimens attached to the surface thereof by electrolytic deposition or painted circuit methods. The corrosion-test probe of this invention is in part an improvement over the test probes previously proposed in that it is adapted to be used both under conditions of high pressure and temperature and also adapted to be connected and disconnected from the corrosive environment without the necessity of relieving the pressure conditions therein.

It becomes therefore a primary object of this invention to provide a corrosion-test probe to be used with an electrical resistance-measuring apparatus adapted to determine the corrosivity of environments under conditions of moderate temperature and pressure.

Another object of this invention is to provide a new form of corrosion-test probe having novel means for holding the test elements.

Another object of this invention is to provide a corrosion-test probe adapted for re-use with various test elements which are easily fabricated from metal strips or wire.

Another object of the invention is to provide a corrosion-test probe which has a built-in common lead and eliminates the necessity for fabricating each assembly of protected and unprotected test elements and common lead thereto.

Still another object of the invention is to provide a corrosion-test probe wherein the outside configuration is smooth and same is adapted to be inserted in inaccessible places confining corrosion environments under investigation.

These and other objects of the invention will become apparent or be described as the description thereof proceeds.

The invention is best described by reference to the attached drawings in which.

Figure 1:
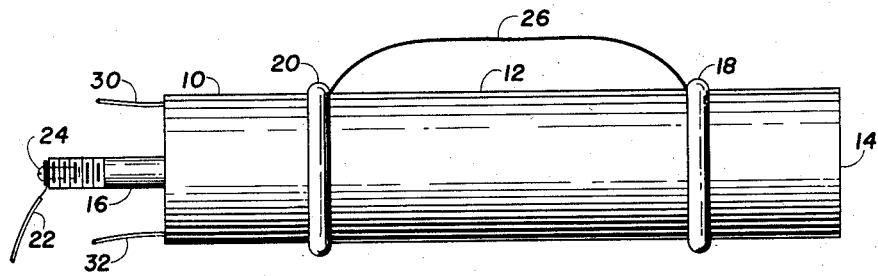
Figure 1 is a plan view of the assembled device.

Referring to the drawings, Figure 1 shows a side elevation view of the device as it appears when assembled with base 10, sleeve 12 and cap member 14, held together upon center post or rod 16. The insulating and sealing O-rings 18 and 20 are held in compression between the members. Rod 16 has attached common lead 22 by means of screw 24. The test element is represented at 26, which may be in the form of a wire or ribbon of the metallic material of construction under test.

Figure 2:
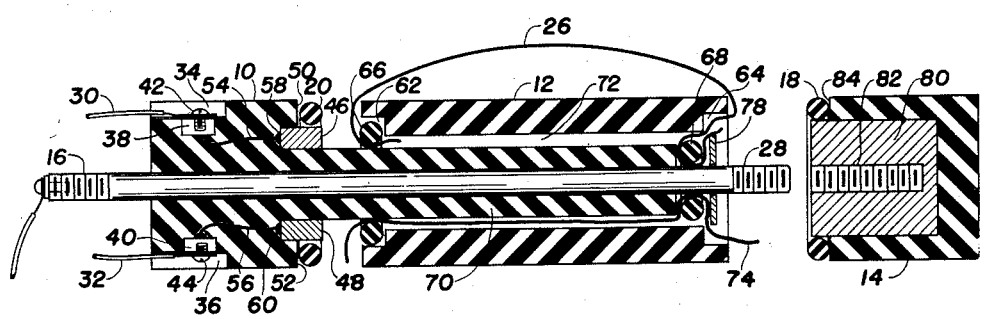
Figure 2 is a partially disassembled vertical cross-sectional view of the embodiment shown in Figure 1.

In Figure 2 the parts are shown in an exploded view. Rod 16 extends through base 10 and terminates in threaded section 28. Leads 30 and 32 extend into recesses 34 and 36 and attach to contact members 38 and 40 by means of screws 42 and 44. Base 10 has half-rings 46 and 48 partially imbedded therein and forming a shoulder for O-ring 20 in cooperation with shoulders 50 and 52 of base 10. Leads 54 and 56 connect between the respective O-rings and contact members 38 and 40, same being welded thereon as indicated at 58 and 60. Sleeve 12 has annular recesses 62 and 64 engaging inner O-rings 66 and 68. Base member 10 has extended portion 70 which is sealed along its entire length onto rod 16. O-rings 66 and 68 hold sleeve 12 in spaced relationship as indicated by annular space 72 from extended portion 70 of base 10. Exposed test specimen 26 has one terminus within space 72, passes through the center opening in ring 66 between member 70, passes between the end of sleeve 12 and O-ring 20, and the other end passes between the end of sleeve 12, O-ring 18, and around and through O-ring 68. A similar arrangement is shown for protected test element 74 except that the main body thereof is within annular space 72 and is thus protected from the corrosive atmosphere. Washer 78 encircles rod 16. Cap member 14 has inner insert or plug member 80 having threaded aperture 82. Plug member 80 extends beyond the edge of cap 14 to form an annular shoulder 84 for O-ring 18.

Figure 3:
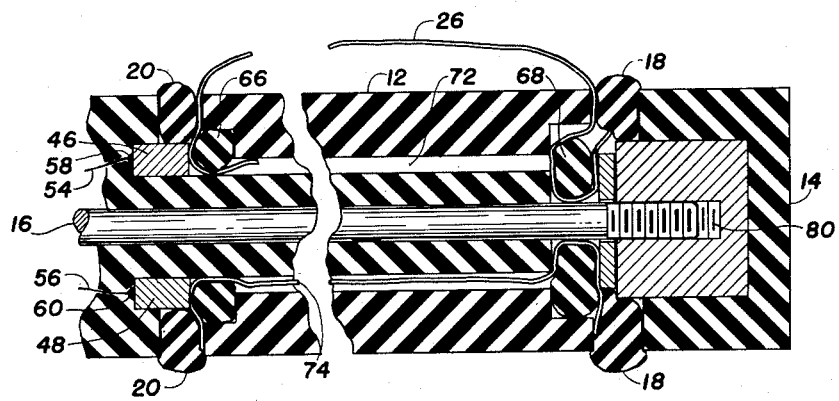
Figure 3 is an enlarged view of Figure 2 showing the sealing action of the O-rings under compression when the device is assembled.

The device is assembled by inserting exposed test specimen 26 so as to engage O-rings 66 and 68 as shown, while same are in position on member 70 and rod 16. Washer 78 is placed on rod 16 and cap member 14 is screwed upon threads 28 of rod 16. This action causes the various shoulder elements to engage the O-rings under compression and cause electrical contact between the exposed and protected test elements so that they have a common juncture through washer 78 and plug member 80 or through direct contact to rod 16. Separate electrical connection to leads 30 and 32 is made through half-rings 46 and 48. This is shown in Figure 3.

The various component parts of the test probe as described may be made of any materials of construction and are preferably made of metal or metal alloys that are resistant to the corrosive action of the environment in which the unit is used. The gaskets and O-rings used in the test probe, which are subjected to elevated temperatures, should be constructed of such insulating and sealing material available that is resistant to corrosion and has good electrical properties. Suitable materials include Bakelite, Lucite, Teflon, paper and fabric laminates such as the phenolic and epoxy resin, laminates where the maximum operating temperature of the test probe does not exceed about 250° F. These materials, described in "Materials and Methods," vol. 42, No. 1, July, 1955, exhibit good metal bonding strength, flexing strength, and arc resistance, and are of low cost. The maximum temperature at which these materials may be joined is about 400° to 450° F. with a time of heating not more than about 5 seconds. The maximum operating temperatures for glass fiber laminates are; melamine, 260° F.; silicone, 300° F.; polystyrene, 170° F.; polyester, 250° F.; Teflon 300° F.+; and epoxy 250° F.+, but the binding temperatures are higher and the dimension stability is improved over paper and fabric laminates. Phenolic nylon fabric laminates would have only limited appplication, since the maximum operating temperature during fabricaton or use is only about 165° F. Ceramic insulators such as titanite, steatite, glass bonded mica, and glass bonded synthetic mica withstand high temperatures and high frequencies. The latter-named mica inorganic materials can be used or fabricated at temperatures as high as 650° to 750° F.

Because of the particular construction of the test probe there is no necessity for employing a protective coating on test specimen 74, since it is sealed within the annular space 72. The test specimens 26 and 74 may be any shape, that is ribbon-like or in the shape of rods. The test specimens have substantially the same resistivity, which means they will have substantially the same chemical composition. Although advantages accrue in constructing the test specimens from materials having the same resistance values, suitable unsymmetrical corrosion testing elements can be fashioned in which the resistances of these elements are not identical, provided, for the sake of consistency, a material of construction is employed which is substantially uniform in composition and resistivity. In general, the ratio of the resistance of the unprotected test specimen to the resistance of the protected test specimen, expressed as $$\frac{R \text{ unprotected}}{R \text{ protected}}$$

may vary from values of about 0.1 to 10. Although the values of these ratios of resistances may vary over wide limits, it is well known to those skilled in this art that as a practical manner there are numerous chemical and electrical factors which have to be taken into consideration in the design of a suitable corrosion test probe. These factors include lead resistance, the size of the assembly, and the factor of temperature compensation. Accordingly, by using test specimens which have substantially the same resistivity, the corrosion test probe will function accurately when connected with the bridge measuring circuit without the necessity of tedious calibration.

The various electrical contacts, such as 58 and 60, are made by the use of copper or silver. In general, the parts may be machined from materials of construction which are designed for use at relatively high pressures and temperatures. For this purpose care should be exercised in the selection of materials for the basic parts of the test probe. The surfaces which contact the O-rings and sealing members should be relatively smooth so that an adequate seal is obtained when the apparatus is assembled. The thread and gasket-sealing surfaces may be coated with a sealing compound to insure against leaks.

From this description it is apparent that the invention is necessarily confined to the use of test specimens which have the property of conducting electricity and show a change in resistance which is proportional to changes in cross-sectional area due to corrosion. The materials of construction that meet these requirements include all metals and metal alloys, such as steel, iron, bronze, brass, copper and the like. The environment to be investigated by the test elements or the completed test probes of this invention may be in any physical state or may exist as a mixture of substances in different physical states. The corrosive environment may be gaseous, vaporous, solid, or semi-solid, or a mixture of these forms of matter. Examples include corrosive gases, such as the halogens, acid or base solutions, flue gases, and mixtures of gases or carrier liquids containing a high content of solids, such as catalyst particles. These environments may be considered to be corrosive either because of their mechanical or chemical effects or combinations of same which result in loss of portions of the exposed test specimen. An example of a corrosive liquid environment would be an acid solution or an ammonia-ammonium nitrate fertilizer solution.

In using the test probe it is mounted on any suitable base member, not shown in the drawings, by means of exposed threaded portion on rod 16. The base member is adapted to support the test probe within an aperture in the wall of a vessel confining a corrosive atmosphere which may be a reactor wall or a pipe wall. Half rings 46 and 48 are separate pieces, not being connected at their spaced termini. The spaces between the ends of the half rings 46 and 48 may be separated by an insulator forming an integral unit and also a continuous sealing surface for O-ring 66 or the space may be filled with cement at the time of fabrication. In assembling the apparatus it is necessary to make sure that the test elements 26 and 74 contact the metal surfaces of the half rings and not the insulated space between their ends. This is accomplished by designing the parts symmetrically and inserting the test elements on opposite sides of sleeve 12 so their ends are inserted opposite the conductive surfaces of the half rings. Sleeve 12 along with the test elements is then forced against O-ring 20 in place on base 10 before the cap 14 is screwed on rod 16. Since the electrical conducting surfaces, namely rod 16, washer 78 and plug 80, are continuous, no precautions need be taken in bringing cap 14 down on rod 16 to hold the parts together in sealed relationship.

It is further apparent from this description that various modifications in the shape and design of the component parts may be made without departing from the scope thereof. The outer configuration of base member 10 or sleeve 12 need not be round and the sealing surfaces provided by the outer and inner recesses need not be annular. By constructing the apparatus symmetrical about the axis of rod 16, fabrication is simplified. Leads 30 and 32 need not extend from the recesses 34 and 36 but may pass directly out the base of the probe. Lead 22 may be attached internally to rod 16 and pass through the insulating base member 10 through a side thereof. The manner in which the ends of the test specimens 26 and 74 are engaged by the annular sealing means 20, 66, 18, and 68 may be changed from that shown in the drawings, as long as contact is made with the corresponding half-ring at one end and contact is made with rod 16 at the other end to form a common electrical juncture. One continuous strip of test metal material may be used to form the protected and unprotected test specimens instead of two separate test strips or wires. The sealing surfaces need not be angular as shown and may be curved to fit the annular sealing means or O-rings. Similarly, the O-rings need not have a circular cross-section but may be square in cross-section to fit the angular recessed sealing surfaces cooperating therewith. Instead of a plug 80 in hollow cup 14 a conductive washer may be used and the threaded portion 82 may be carried by the insulating body 14. Accordingly, the only limitations attaching to the invention appear in the appended claims.

What is claimed is:

1. A corrosion test probe comprising an external insulating base means supporting a conductor rod, a cap means attached to one end of said rod to present an annular, continuous sealing surface toward said base means, said base means having a corresponding annular, continuous sealing surface toward the sealing surface of said cap means, a sleeve means encompassing and spaced from said base means and having terminal annular, continuous sealing surfaces opposite the sealing surfaces of said base means and said cap means, resilient annular seals between said opposed sealing surfaces, a pair of elongated test specimens mounted longitudinally by said base means, each having their contiguous ends held by said sealing surfaces and said annular seals under compression by said cap means, one of said test specimens having its body portion outside said base and said sleeve means, the other of said test specimens having its body within the annular space between said sleeve means and said base means, and one pair of contiguous ends of said test specimens being maintained in electrical contact with said conductor rod forming a common lead therefrom.

2. A corrosion test probe in accordance with claim 1 in which said cap means has an inner conductive plug attachable to said conductor rod, said conductive plug making contact with the contiguous ends of said test specimens contacting said conductive rod.

3. A corrosion test probe in accordance with claim 2 in which a conductive washer is between said contiguous ends of said test specimens and said conductive plug.

4. A corrosion test probe in accordance with claim 1 in which an annular resilient sealing means surrounds said conductive rod and the contiguous ends of said test specimens pass between the inner annular surface of said sealing means and the outer surface of said conductive rod to hold same in contact therewith.

5. A corrosion test probe in accordance with claim 1 in which an annular resilient sealing means surrounds said base member and the other contiguous ends of said test specimens pass between the inner annular surface thereof and the outer surface of said base means to hold same in place.

6. A corrosion test probe holder comprising a base member having an enlarged end portion and an elongated portion with a shoulder formed therebetween a pair of separate, conductive half rings imbedded in said shoulder to form a first outer annular recessed sealing surface, a conductor rod within said base member and extending beyond the end of said elongated portion, a hollow insulating cap member, a conducting plug within said cap, a portion of said plug extending beyond the edge of said cap member to form a second outer annular recessed sealing surface, said cap attaching to the extended end of said rod, a sleeve member encompassing said elongated portion of said base member and annularly spaced therefrom, an inner annular recess in each end of said sleeve thereby forming an outer annular projection, the recess of said shoulder on said base and the recess of said cap member matching said projection, and sealing means between said sealing surfaces held in place by said cap.

7. A corrosion test probe comprising a base member having an enlarged end portion and an elongated portion with a shoulder formed therebetween, a pair of separate conductive half-rings imbedded in said shoulder to form a first outer, annular, recessed, sealing surface, a conductor rod within said base member and extending beyond the end of said elongated portion thereby forming an inner shoulder, a hollow cap member, a conductor plug within the hollow of said cap member, a portion of said plug extending beyond the edge of the hollow of said cap member to form a second outer, annular, recessed, sealing surface, said cap member adapted to attach to the extended end of said rod, a sleeve member encompassing said elongated portion of said base member and annularly spaced therefrom, an inner annular recess in each end of said sleeve thereby forming an outer annular projection, the recess of said shoulder on said base and the said second recess on said cap member matching said projection, annular sealing means disposed within said first and second outer recessed sealing surfaces, an annular sealing means on said rod against said inner shoulder, an annular sealing means within the inner annular recess of said sleeve adjacent said half-rings, a test specimen having one end held in place between said annular sealing means in said inner annular recess of said sleeve and one of said half-rings, the other end of said test specimen being held in place against said rod and against said plug by the annular sealing means against said inner shoulder, the body of said test specimen being outside said sleeve, a protected test specimen having its body within the annular space between said sleeve and the elongated portion of said base member, one end of said protected test specimen being held in place between said annular sealing means in said inner annular recess of said sleeve and one of said half-rings, the other end of said protected test specimen being held in place against said rod and against said plug by the annular sealing means against said inner shoulder.

8. A corrosion test probe in accordance with claim 7 in which said test specimens are in the form of an elongated strip of metal to be tested and the respective ends of said strips pass through the openings of said annular sealing means.

9. A corrosion test probe in accordance with claim 8 in which a conductive metal washer is located between the ends of said test specimens passing through the opening of the annular sealing means against said inner shoulder in said elongated portion of said base and the conductive plug within said cap member.

10. A corrosion test probe comprising a base member having an enlarged end portion and an elongated portion with a shoulder formed therebetween, a pair of separate conductive half-rings partially imbedded in said shoulder to form a first outer, annular, recessed sealing surface therewith, a first annular sealing ring within said sealing surface, a conductor rod imbedded within said base member and said elongated portion thereof, said conductor rod extending beyond the enlarged portion of said base to form one electrical terminal, said conductor rod extending beyond the end of said elongated portion of said base thereby forming an inner shoulder with the end thereof, a second annular sealing ring surrounding said rod and against said inner shoulder, a conductive washer around the extended end of said rod, a hollow cap member adapted to attach to the extended end of said rod against said washer, a conductive plug within the hollow of said cap member, a portion of said plug extending beyond the edge of the hollow of said cap member to form a third annular recessed sealing surface, a third annular sealing ring within said sealing surface, a sleeve member surrounding the elongated portion of said base member and annularly spaced therefrom, an inner annular recess in each end of said sleeve thereby forming an outer annular projection, the projection at one end of said sleeve forming a sealing surface against said first annular sealing ring, the projection at the other end of said sleeve forming a sealing surface against said third annular sealing ring, a fourth annular sealing ring within the inner recess at one end of said sleeve and adjacent said half-rings, a test specimen having its body outside said sleeve, one end of said test specimen being held by said corresponding projection and said first sealing ring and by said fourth sealing ring against one of said half-rings, the other end of said test specimen being held by said corresponding projection and said third sealing ring and by said second sealing ring against said rod and said washer, a protected test specimen having its body within the annular space between said sleeve and said elongated portion of said base member, one end of said protected test specimen being held by said fourth sealing ring against the remaining of said half-rings, and the other end of said test specimen being held by said second sealing ring against said rod and against said washer to form a common juncture with said other test specimen.

11. A corrosion test probe in accordance with claim 10 in which each of said half-rings has an electrical lead connected thereto through said base member and said plug member has a topped hole into which the extended end of said rod is threaded.

References Cited in the file of this patent

UNITED STATES PATENTS

| | | |
|---|---|---|
| 426,204 | Munsie | Apr. 22, 1890 |
| 2,016,660 | Weeks | Oct. 8, 1935 |
| 2,443,654 | Else et al. | June 22, 1948 |
| 2,735,754 | Dravnicks | Feb. 21, 1956 |